(12) United States Patent
Wu (10) Patent No.: US 8,234,485 B2
(45) Date of Patent: Jul. 31, 2012

(54) METHOD RELATING TO RULE-REGULATED SOFTWARE CONFIGURATION

(75) Inventor: Yuh-Cherng Wu, San Jose, CA (US)

(73) Assignee: SAP AG, Walldorf (DE)

( * ) Notice: Subject to any disclaimer, the term of this patent is extended or adjusted under 35 U.S.C. 154(b) by 1756 days.

(21) Appl. No.: 11/028,260

(22) Filed: Jan. 4, 2005

(65) Prior Publication Data

US 2006/0155891 A1    Jul. 13, 2006

(51) Int. Cl.
G06F 21/00 (2006.01)
G06F 9/00 (2006.01)
G06F 9/24 (2006.01)
G06F 1/24 (2006.01)
G06F 15/177 (2006.01)

(52) U.S. Cl. ............. 713/1; 713/100; 710/10; 717/121; 717/126; 717/168; 717/169; 717/170; 717/171; 717/172; 717/173; 717/174; 717/175; 717/176; 717/177; 717/178; 706/50; 706/54; 706/61

(58) Field of Classification Search .................... 710/10; 713/100, 1; 706/50, 54, 61; 717/121, 168–178
See application file for complete search history.

(56) References Cited

U.S. PATENT DOCUMENTS

| | | | | |
|---|---|---|---|---|
| 5,428,791 A * | 6/1995 | Andrew et al. | ................ | 717/121 |
| 5,664,093 A * | 9/1997 | Barnett et al. | .................. | 714/31 |
| 5,748,880 A * | 5/1998 | Ito et al. | .......................... | 714/46 |
| 5,870,727 A * | 2/1999 | St. Jacques et al. | ............ | 706/11 |
| 6,161,176 A | 12/2000 | Hunter et al. | | |
| 6,185,583 B1 * | 2/2001 | Blando | ......................... | 715/210 |
| 6,266,811 B1 * | 7/2001 | Nabahi | ......................... | 717/174 |
| 7,051,243 B2 * | 5/2006 | Helgren et al. | ................. | 714/48 |
| 7,302,562 B1 * | 11/2007 | Jacobson et al. | ............. | 713/100 |
| 7,350,207 B2 * | 3/2008 | Fisher | ........................... | 717/178 |
| 7,389,444 B2 | 6/2008 | Ma et al. | | |
| 2002/0161668 A1 * | 10/2002 | Lutz et al. | ....................... | 705/26 |
| 2005/0188268 A1 * | 8/2005 | Verbowski et al. | ............ | 714/37 |
| 2006/0155909 A1 | 7/2006 | Wu | | |

OTHER PUBLICATIONS

Screen shots of a Wizard Builder sold by SAP AG, 7 sheets.
Symantec, "Norton AntiVirus™ 2005" Obtained from the Internet on Oct. 11, 2004 at http://www.symantecstore.com/dr/sat2/Ec_Main.entry24?SP=10023&PN=1&V1=641220&xid=27674&search_id=501753037&doc_id=1&DSP=&CUR=840&PGRP=0&CACHE_ID=0, 2 pages.
Screen Shots of a Wizard Builder sold by SAP AG, 7 Sheets—Jan. 3, 2005.

* cited by examiner

*Primary Examiner* — Christian LaForgia
*Assistant Examiner* — Kari Schmidt
(74) *Attorney, Agent, or Firm* — Mintz, Levin, Cohn, Ferris, Glovsky and Popeo, P.C.

(57) ABSTRACT

A method relating to rule-regulated configuration of software includes receiving an unsuccessful configuration that a sender computer system sends to a recipient computer system upon software being unsuccessfully configured in the sender computer system. Validation rules for configuring the software allowed the unsuccessful configuration. The validation rules are modified in the recipient computer system using the using the unsuccessful configuration. The modified validation rules are provided to the sender computer system. Several sender systems may routinely report new configurations to the recipient computer system. The rules may be modified upon creating a variation of the configuration and determining whether it successfully configures the software. The variation may involve using a probabilistic distribution.

23 Claims, 4 Drawing Sheets

METHOD RELATING TO RULE-REGULATED SOFTWARE CONFIGURATION

TECHNICAL FIELD

This description concerns a method relating to rule-regulated configuration of software.

BACKGROUND

Configuring computer software applications can be a complicated task for end-users to perform, and for developers of software applications to accurately foresee and accommodate. For example, there are usually several choices to be made in configuring the software (or "driver") that controls the operations of a mouse or a printer connected to a personal computer. Therefore, software configuration programs such as wizards have been provided for configuring software applications. A wizard may present sequential screens to the user for making various inputs, and the software application may thereafter be configured using the user inputs.

In larger software systems, such as those that control enterprise-wide operations, it may be desirable or necessary to allow extensive configuration. The configuration is usually created by a system administrator of the organization that is to use the system (the organization is the "customer" of the software). Different customers may have very different needs and circumstances that require significantly different configurations of the software. The extensive configuration capability adds complexity to the development and testing of the software. Moreover, the customers sometime run into problems when selecting a configuration that has not been sufficiently tested, because such a configuration may be deficient or unsuccessful.

It may therefore be advantageous to provide guidance regarding permissible configurations, for example through a wizard that is used in configuring the software. However, due to unforeseen circumstances, a configuration that appears to be good or safe may nevertheless be unsuccessful, resulting in the software not working properly with the chosen configuration. When this condition occurs, there is a need to find a successful configuration. Moreover, there is a need to modify the provided guidance so that the unsuccessful configuration, and possibly others as well, are thereafter prevented. Existing systems may be deficient in this respect. Also, existing systems may not be able to derive useful information from various customers' experiences with successful configurations.

SUMMARY

The invention relates to methods relating to rule-regulated configuration of software.

In a first general aspect, a method comprises receiving an unsuccessful configuration that a sender computer system sends to a recipient computer system upon software being unsuccessfully configured in the sender computer system. The unsuccessful configuration was allowed by validation rules for configuring the software. The method comprises modifying, in the recipient computer system, the validation rules using the unsuccessful configuration. The method comprises providing the modified validation rules to the sender computer system.

In selected embodiments, the recipient system uses experiences shared by several sender systems in modifying the validation rules.

The recipient system may generate a variation of the unsuccessful configuration and use the variation in modifying the validation rules. The variation may comprise changing a value in the unsuccessful configuration, or changing which parameters in the unsuccessful configuration are provided with values. A change may be based on a probabilistic distribution.

Advantages of the systems and techniques described herein may include any or all of the following: Improving use of validation rules for software configurations; providing a more efficient modification of validation rules; providing improvement in choosing software configurations based on earlier configurations; providing useful sharing of customer experiences in configuring software; providing rule updating based on shared customer experiences; providing a heuristic approach to improve quality of validation rules; providing an efficient approach to explore undetected defects in validation rules or exploring possible variations in validation rules based on simulations, and providing more efficient updating of validation rules.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
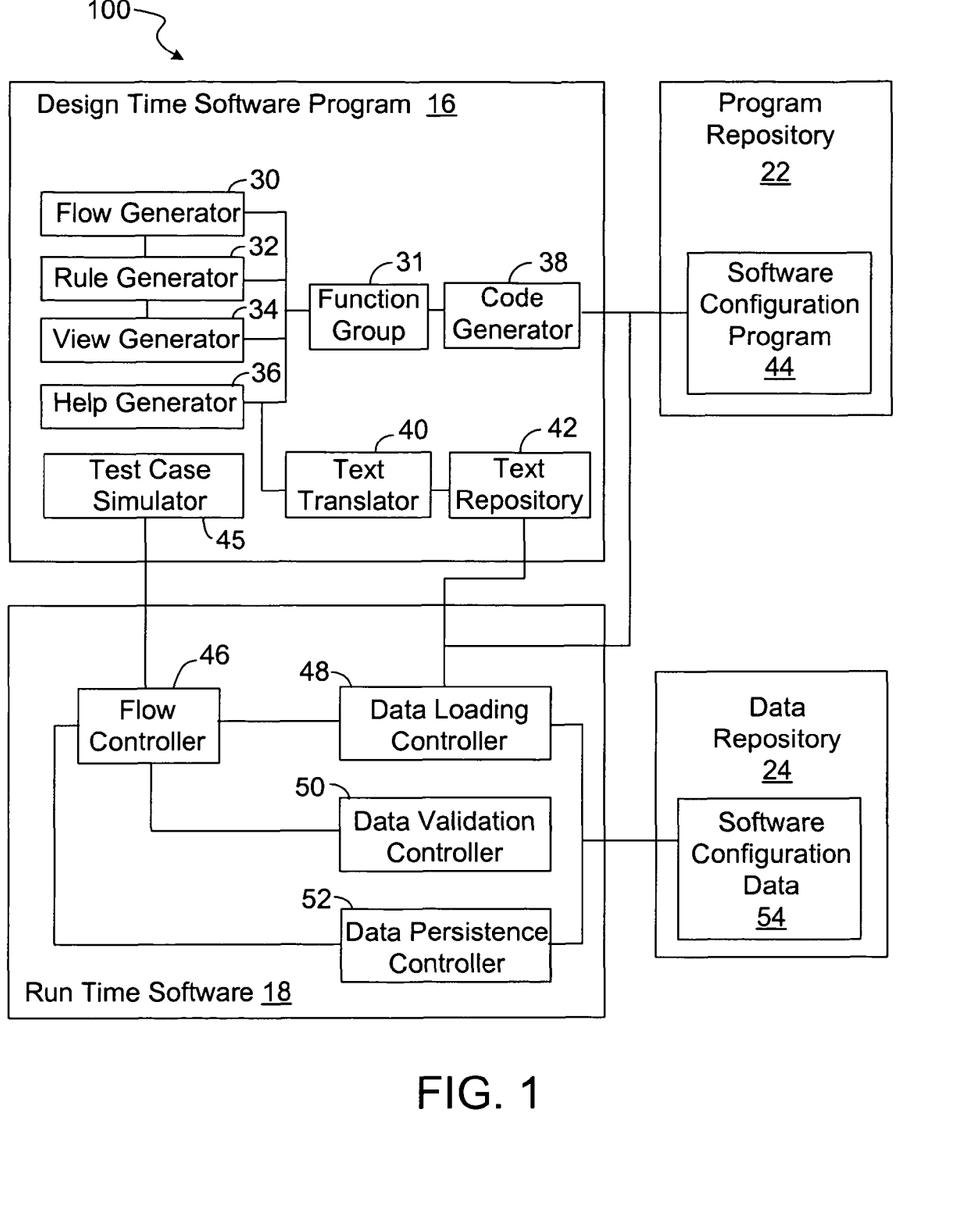
FIG. 1 is a block diagram of software modules that may be used to design a software configuration program that uses validation rules.

FIG. 1 shows an architecture 100 of software modules. Particularly, the architecture can be used to create and subsequently use a software configuration program 44, such as a wizard. The program 44 may have validation rules that regulate configuration of a software program. Validation rules can be modified using an unsuccessful configuration, as will be described.

A design-time software program 16 is used to generate the program 44. A run-time software program 18 is used for managing and controlling the execution of the program 44. Generally, executing the design-time software program 16 may result in the software configuration program 44 being stored in a program repository 22. Executing the run-time software program 18 may result in software configuration data 54 being stored in the data repository 24. Examples of the operations of the programs 16 and 18 will now be described.

The design-time software program 16 is made up of several software modules. A flow-generator module 30 generates a function group 31 which is used by the software modules of the design-time software program 16 to store data objects used in generating the software configuration program 44. The data objects stored in the function group 31 may consist of (1) defined tasks to be executed by the software configuration program 44, (2) graphical user interfaces that are to be displayed upon execution of the defined tasks, and (3) any reference pointers to textual explanations that may be provided to the user upon execution of defined tasks.

The flow-generator module 30 displays a graphical user interface that prompts a user to define a command structure (e.g., steps and procedures) that is to be executed by software configuration program 44. The flow-generator module 30 allows the user to specify command structure definitions sequentially (e.g., step 1 followed by step 2). In some embodiments, the flow-generator module 30 also may allow the user to specify logical conditions that can affect the sequence of command structure execution (e.g., step 1 followed by step 3 if a certain logical condition exists, otherwise step 1 followed by step 2) depending upon the type of configuration required for a particular software application program. Once the command structure is defined, the flow-generator module 30 stores the defined command structure as an object in the function group 31.

The flow-generator module 30 may also provide the ability to identify a graphical user interface (e.g., screen display) and a textual explanation (e.g., help documentation) that are associated with a particular step defined in the command structure. For example, the flow-generator module 30 may store a graphical user interface identifier representing a graphical user interface to be displayed for a particular step in the function group 31. Similarly, if a textual explanation is identified for a particular step, the flow-generator module 30 may store a textual explanation identifier representing the textual explanation for the particular step in the function group 31.

A view-generator module 34 provides the ability to generate and bind a graphical user interface to the command structure defined by the flow-generator module 30. Once a graphical user interface for a step is identified, the flow-generator module 30 may store a graphical user interface identifier representing a graphical user interface associated with a particular step in the function group 31. The view-generator module 34 also provides the ability to create graphical user interfaces that include 'user selectable options' (e.g., dialog boxes, buttons, check boxes, lists, menus, etc.). In one embodiment, for example, the view-generator module 34 provides a selectable palette of 'user selectable options' that can be arranged by the user to design a graphical user interface for a particular step defined in the command structure. Once the design of graphical user interfaces is complete, the view-generator module 34 stores the graphical user interface in the function group 31.

A rule-generator module 32 allows the user to define one or more rules that are to be executed by the software configuration program 44 when a particular event occurs. In one embodiment, for example, the rule-generator module 32 is accessible from the flow-generator module 30 and can be executed while defining the command structure for the software configuration program 44. For example, the command structure necessary to customize a software application may vary depending upon the particular computing environment in which the software application is installed. In such situations, binding a rule to a particular step in the command structure of software configuration program 44 may allow execution of only those steps necessary to configure a particular software application.

The rule-generator module 32 also is accessible to the view-generator module 34 and can be used to bind a rule to 'user selectable options' defined for one graphical user interface that determines allowable 'user selectable options' on subsequent graphical user interfaces. Several benefits may stem from this design. One advantage relates to the efficiency of the configured software application. By binding a rule to one 'user selectable option' that determines allowable values for subsequent 'user selectable options' the system may ensure that configured software applications are configured as effectively as possible.

Accordingly, the rule-generator module 32 lets the user create validation rules for the configuration of a software program. It will be described later how such configuration rules can be applied upon user configuration of software and how the validation rules can be modified based on performed configurations.

A help-generator module 36 provides a graphical user interface that allows a user to describe using free-form text the steps and 'user selectable options' available to a user during execution of software configuration program 44. In one embodiment, for example, the help-generator module 36 provides a free-form text area that allows a textual explanation of 'user selectable options' to be specified. Once the textual explanation is entered, the help-generator module 36 stores a pointer object representing the textual-explanation in the function group 31 and stores the text-explanation as a file in the text repository 42. In some embodiments, the help-generator module 36 also can invoke a text-translator module 40 that translates the textual-explanation into one or more different languages. The help-generator module 36 then stores the translated text as a file in the text repository 42.

Once the various software modules included in the design-time software program 16 have created and configured the function group 31, a code-generator module 38 may generate the executable software configuration program 44. The code-generator module 38 may include constructor methods and a generate method that constructs the executable software configuration program 44. Once generated, the software configuration program 44 can be executed and display various features, such as (1) the steps defined by the flow-generator module 30, (2) the graphical user interfaces generated by the view-generator module 34, and (3) any explanatory information generated by the help-generator module 36. The code-generator module 38 stores the executable software configuration program 44 in the program repository 22.

The program repository 22 provides storage for one or more executable software configuration programs. There may be more than one configuration program in the system, for example when several software programs are designed to be configured using respective different configuration programs. More than one program repository 22 may be used.

The run-time software program 18 provides a set of software modules that provide execution control and management of the software configuration program 44. One or more software modules are accessible to the run-time software program 18 from the design-time software program 16. In one embodiment, for example, a test-case simulator 45 is accessible to the run-time software program 18 from the design-time software program 16. The test-case simulator 45 provides a testing capability for the software configuration program 44. The test-case simulator 45 emulates the selection of 'user-selectable options' that may be selected by the user during execution of the software configuration program 44. For example, the software configuration program 44 may provide a first step having five 'user selectable options' and a successive step having three 'user selectable options.' The test-case simulator 45 can generate all the possible combinations of 'user-selectable options' that the user may select from the first step and the second step and then configure a software application using each of these possible combinations. Once the software application is configured for a particular emulated combination, the test-case simulator 45 may execute the configured software application program to ensure reliable configuration of the software application program using these options.

The run-time software program 18 also includes a flow-controller 46, a data-loading controller 48, a data-validation controller 50, and a data-persistence controller 52. The flow controller 46 provides execution control for the software configuration program 44. The flow controller 46 may control the sequential navigation of steps (e.g., step one followed by step two) that were defined by the design-time software program 16. The flow controller 46 may ensure the proper configuration of a software application by providing a defined navigation between steps during execution of the software configuration program 44.

In other embodiments, the flow controller 46 may provide non-sequential navigation (e.g., step one followed by step N, where N may be any other defined step stored in the command structure) of steps defined by the flow generator 30. The non-sequential navigation of steps during execution can be triggered by execution of a rule defined for a particular step using the rule generator 32. In yet other embodiments, the functionality provided by the flow controller 46 may be included in the executable software configuration program 44 generated by the code generator 38.

The data-loading controller 48 provides data access functionality for the software configuration program 44. In one embodiment, for example, graphical user interfaces generated by the view-generator module 34 may have user selectable parameters that require access to database information. The data-loading module 48 executes the data access methods associated with 'user selectable options' during execution of the software configuration program 44. The data-loading controller 48 also may access any textual-explanations defined for a particular step from the text repository 42 and provide the accessed textual-explanation to the software configuration program 44 during execution. The data-loading controller 48 provides the ability to access only that language appropriate for a particular user.

The data-validation controller 50 executes one or more rules defined by the rule-generator module 32 of the design-time software program 16. For example, a first parameter selection made by the user may cause the data-validation controller 50 to execute one or more rules that can limit or enhance 'user selectable options' displayed in subsequent steps.

Once the user of the software configuration program 44 determines that the configuration is correct, the data-persistence controller 52 provides for storage of the software application configuration data 54 entered by the user. The user-entered data may include one or more values that the user has provided for configuration parameters. The data repository 24 provides storage for the software configuration data 54 generated by the software configuration program 44. There may be more than one unit of software configuration data in the system. For example when several software programs are designed to be configured, each may have its own file of software configuration data stored in the data repository 24. More than data repository 24 may be used.

The software configuration program may be used to guide a user in configuring software and to apply the validation rules to allow or reject specific configurations. When several customers are expected to use the software program, the configuration program may be provided to each customer's system. Moreover, knowledge from individual customers' experience with configuring the software can be shared and used in modifying the validation rules.

Figure 2:
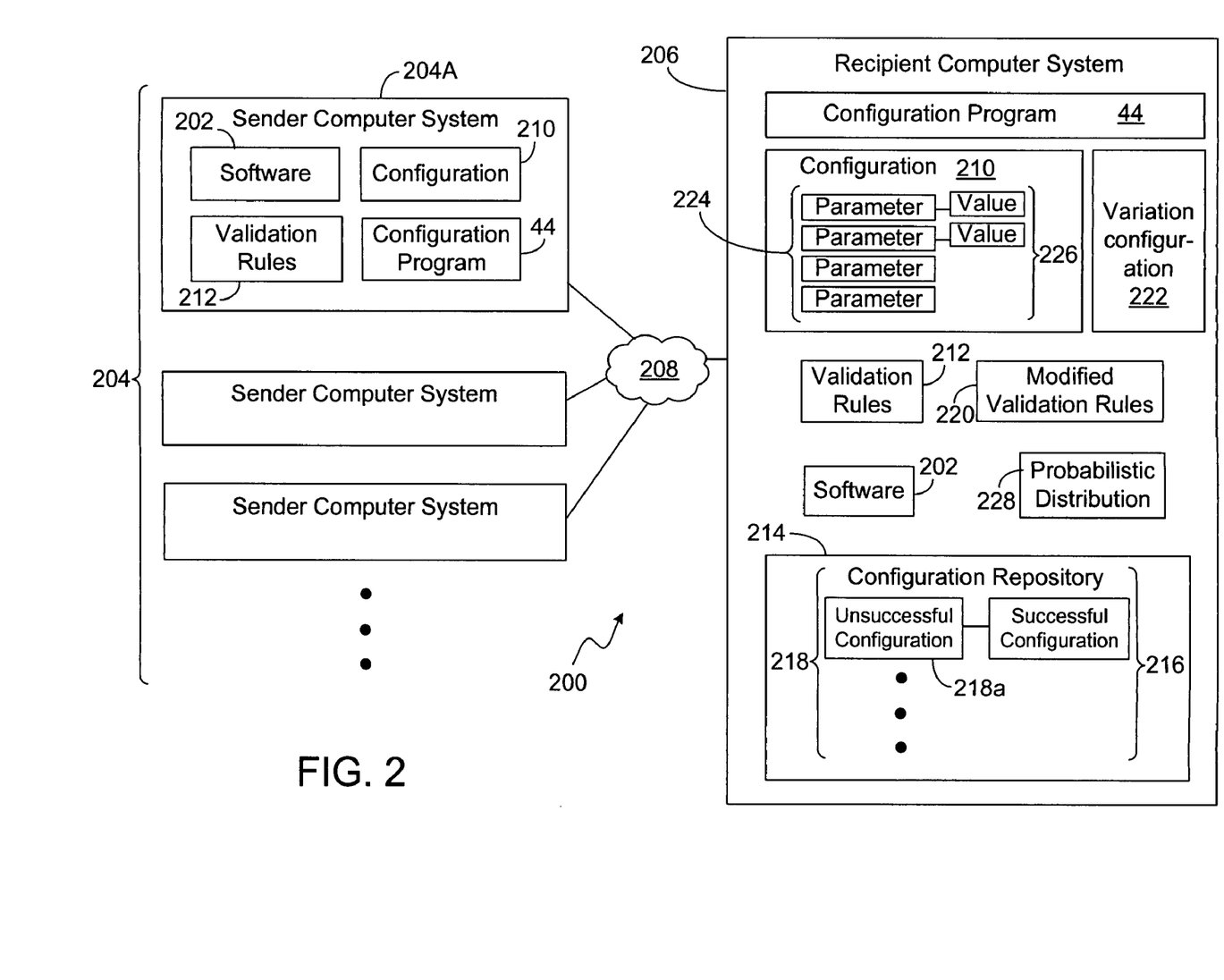
FIG. 2 is a block diagram of a computer system in which validation rules created using the modules shown in FIG. 1 can be used and modified.

FIG. 2 shows a computer system 200 wherein software 202 is provided for use in one or more sender computer systems (SCS) 204. For example, each of the SCS 202 belongs to a customer of the software 202. Here, the software 202 is explicitly shown in a first SCS 204A. The manufacturer of the software 202, in turn, may operate a recipient computer system (RCS) 206 that can communicate with any of the SCS through any kind of network 208.

The software 202 may be configured in the SCS to which it is provided and doing so generates a configuration 210. The procedure of configuring the software is guided by validation rules 212 that may be included in the software 202 or provided separately, such as in the configuration program 44 that has been described above. The individual SCS may access the configuration program 44 on the RCS or a separate version of the configuration program 44 may be provided to the SCS. The configuration 210 may correspond to, or include, the software configuration data 54 described above.

The SCS may routinely send new software configurations to the RCS (hence the terms "sender" and "recipient") upon creating them. The RCS may store the received configurations in a configuration repository 214 and use them as needed. The received configurations may include one or more successful configurations 216—that is, a configuration that results in the software 202 operating as intended. Moreover, the received configurations may include one or more unsuccessful configurations 218 that, despite being allowed by the validation rules 212, were unsuccessful in configuring the software 202. Thus, the repository 214 may be considered a configuration case base documenting customers' attempts at configuring the software. Any configuration's status as successful or unsuccessful may be provided to the RCS in connection with sending the particular configuration.

The occurrence of the one or more unsuccessful configurations, such as the configurations 210 and 218, indicates a deficiency in the validation rules 212 that should be overcome by modifying the rules. Therefore, when the configuration 210 proves unsuccessful although the validation rules 212 allow it, the RCS may modify the validation rules 212 that are stored in the RCS. The RCS uses the unsuccessful configuration 218A in generating modified validation rules 220. The RCS then provides the modified validation rules 220 to the SCS 204. When the system 200 includes several SCS 204, the RCS may provide the modified validation rules 220 to each of the SCS. Thus, the experience is shared and each SCS may benefit from the improved rules.

The way that the RCS determines how to modify the validation rules may be different depending on the structure of the rules and how they are applied. One example of modifying the validation rules 212 is to add a rule that explicitly prohibits the unsuccessful configuration 218A. As another example, when the RCS can identify at least one particular rule in the validation rules 212 that causes the unsuccessful configuration 218A to be allowed, the rule or rules may be modified or removed.

Moreover, the RCS may modify the validation rules 212 based on a simulation that it performs. The executable instructions that handle the simulation may be included in the test case simulator 45 or directly in the configuration program 44, to name two examples. Such simulation(s) may consist of the RCS varying some aspect of the unsuccessful configuration, executing the software 202 to see whether the configuration is successful, and using this knowledge in modifying the validation rules. Particularly, the simulation may involve generating a variation configuration 222 that is a variation of the configuration 210. The following are examples of such variations.

The configuration 210 may include several parameters 224 that can potentially be provided with one or more values 226. That is, the particular configuration 210 may be characterized by which of the parameters 224 are provided with values, by which values are provided, or by a combination of these features, to name a few examples.

Thus, the variation 222 may comprise a change in one or more of the values 226. The RCS may substitute a new value for the original value, for example by analyzing the examples of values that have been used in the configurations 216 and 218 stored in the repository 214. For values 226 that are numerical the variation 222 may comprise an increase or decrease in the value. Such a value change may be generated by creating one or more probabilistic distributions 228. That is, the probabilistic distribution may comprise a range for the numerical value and respective probabilities associated with respective values within the range. The probabilistic distribution may be heuristically assigned to the value, for example as a result of processing knowledge obtained from several sender systems sharing their experiences regarding particular configurations.

The probabilities may be determined by analyzing configurations in the repository 214. The determination may be done using conventional mathematical algorithms and/or models. Such tools can be incorporated in the configuration program 44 or may be stored separately in the RCS. For example, if the tools are included in the configuration program 44 on the RCS they may be omitted in the version of the configuration program that is provided to the SCS. Another example is that the tools can be included in the test case simulator 45. In one embodiment, the probabilistic distribution starts with a uniform distribution so each possible value may be selected for simulation with the same probability. In another example, the distribution can be updated if one value is used more often by customers than others. In this case, the distribution represents the actual usage of those values from collected data.

Figure 3:
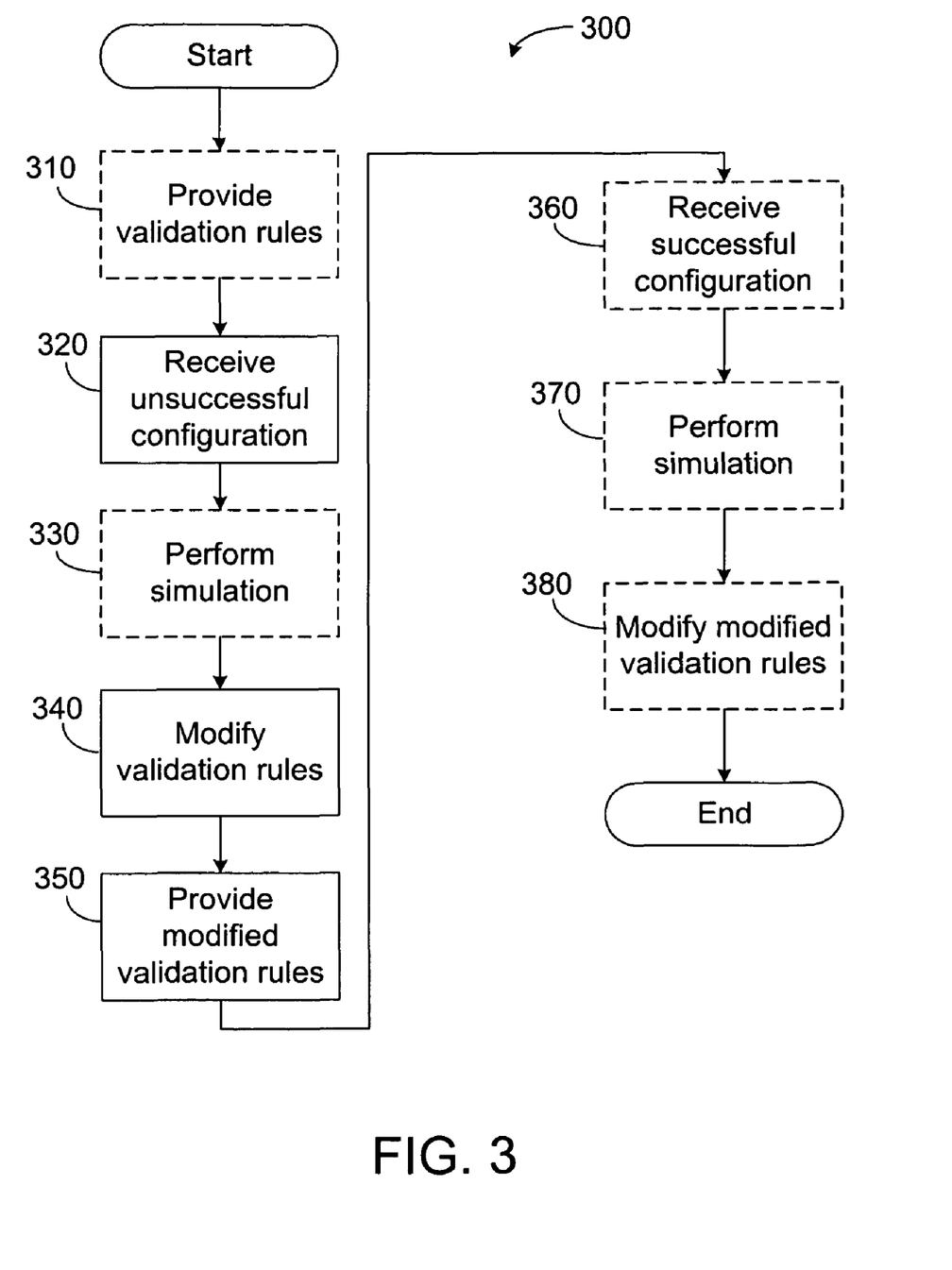
FIG. 3 is a flow chart of an embodiment of an inventive method.

FIG. 3 is a flow chart of a method 300 that can be performed in the system 200. For example, a computer program product may include instructions that cause a processor to perform operations comprising the steps of the method 300. As shown in FIG. 3, the method 300 includes the following steps:

Providing validation rules in optional step 310. For example, the RCS 206 can provide the validation rules 212 to the one or more SCS 204. The validation rules may be provided for use by the SCS in creating a configuration 210 for the software 202. Applying the validation rules may result in the SCS accepting or rejecting the configuration proposed by the user. In some implementations, the SCS routinely look for updated validation rules before initiating configuration of the software. Accordingly, if new or updated rules are then available, the SCS may obtain them (optional step 310) before the configuration.

Receiving an unsuccessful configuration in step 320. The unsuccessful configuration is sent from a sender computer system to a recipient computer system upon software being unsuccessfully configured in the sender computer system. Moreover, validation rules for configuring the software allowed the unsuccessful configuration. For example, the SCS 204A sends the unsuccessful configuration 210 to the RCS 206 upon determining that the configuration 210 results in the software 202 being improperly configured.

Performing a simulation in optional step 330. The simulation may comprise creating the variation 222 and determining whether it successfully configures the software 202. The variation may comprise a change in the values 226 provided to any of the parameters 224. The variation may comprise a change in which of the parameters 224 are provided with values. Any or all of these changes may be based on the probabilistic distribution 228. The RCS may execute the software to determine whether the configuration is successful.

Modifying the validation rules in step 340. The validation rules are modified in the recipient computer system using the unsuccessful configuration. For example, the RCS 206 can use the configuration 210 in modifying the validation rules 212, and thus create the modified validation rules 220.

Providing the modified validation rules to the sender computer system in step 350. For example, the RCS 206 can provide the modified validation rules 220 to any or all of the SCS 204. Particularly, this step may allow others of the SCS to share benefits of the experiences of the one SCS that sent the RCS its unsuccessful configuration.

Receiving a successful configuration in optional step 360. The successful configuration may be sent from an SCS that is the same as, or different from, the SCS that sent the unsuccessful configuration in step 320. The SCS may routinely send their configurations for the RCS to include them in the configuration case base. This may solidify the configuration case base and increase its completeness to the benefit of the RCS that uses it.

Performing a simulation in optional step 370. The simulation is based on the successful configuration that can be received in optional step 360. In one sense, the received successful configuration is an indication that the validation rules are working as intended, because the rules allowed a SCS to create a configuration that proved successful. On the other hand, it may be difficult to know whether the rules are mistakenly rejecting configurations that would in fact be successful; that is, whether the rules are too narrow. The purpose of the optional simulation in step 370 is to use the successful configuration in exploring whether the rules should be modified. In other words, the RCS may use the received successful configuration in a heuristic approach to improve the validation rules: by starting with a known successful configuration and exploring what other configurations may also be viable. The RCS can test each generated variation against the software 202 to see whether the configuration is successful.

The simulation may involve creating the probabilistic distribution 228 for one or more of the parameters in the successful configuration, and thereafter providing the variation 222 with a different value based on the probabilistic distribution. For example, the probabilistic distribution may suggest that the value can be increased higher, or decreased lower, than what is currently contemplated.

The variation may comprise a change in which parameters of the successful configuration are provided with values. That is, if only some of the successful configuration's parameters are provided with values, the variation may provide values for more or fewer of the parameters. This variation may also involve the use of a probabilistic distribution. That is, conventional mathematical algorithms or models can be used to analyze, in the repository 214, the distribution of which parameters are provided with values, and the results of this analysis are then used to generate at least one change in the variation.

Modifying the modified validation rules in optional step 380. The modification is based on the optional simulation that can be performed in step 370. For example, the RCS 206 may modify the modified validation rules 220 so that the rules now allow at least one previously impermissible configuration. As another example, the rules may be modified to reject at least one previously permissible configuration upon determining in the simulation that such a configuration would not be successful. The modified rules can be distributed to one or more of the SCS, for example in accordance with step 310 above.

Figure 4:
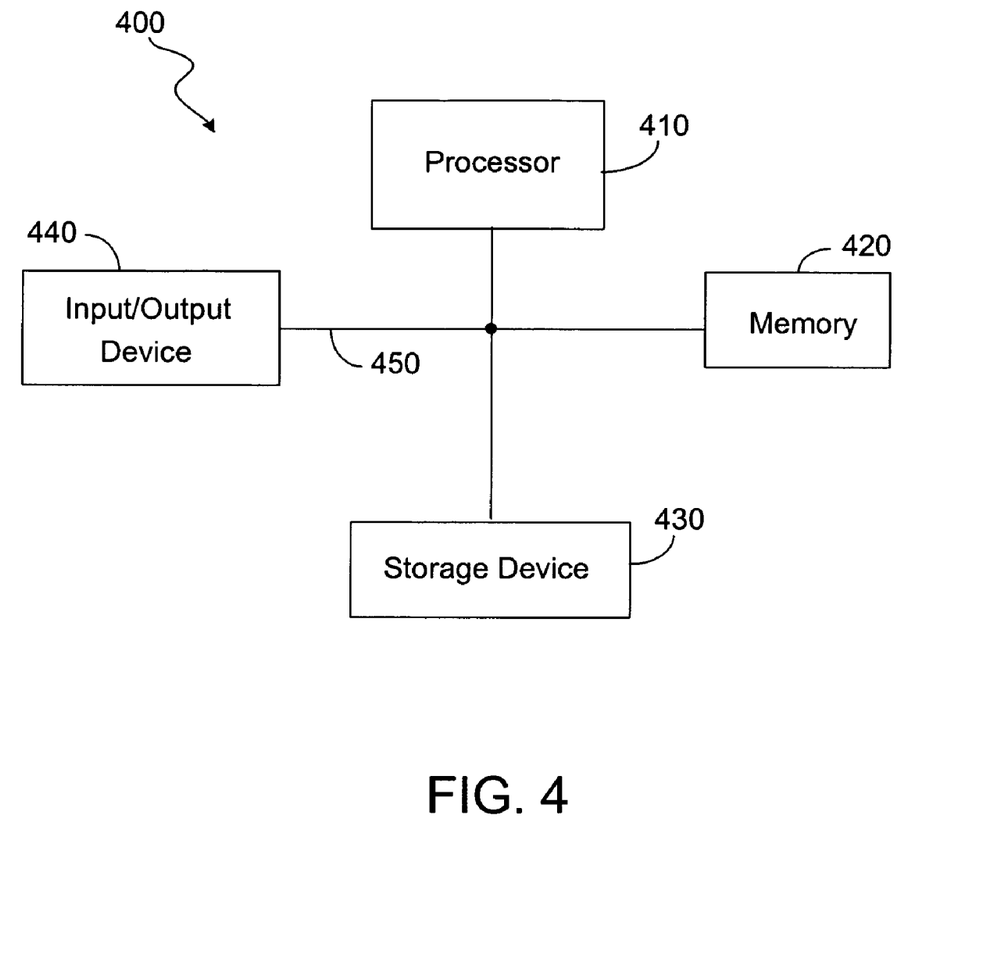
FIG. 4 is a block diagram of a general computer system.

FIG. 4 is a block diagram of a computer system 400 that can be used in the operations described above. For example, one or more systems 400 may be included in either or both of the systems 100 and 200.

The system 400 includes a processor 410, a memory 420, a storage device 430 and an input/output device 440. Each of the components 410, 420, 430 and 440 are interconnected using a system bus 450. The processor 410 is capable of processing instructions for execution within the system 400. In one embodiment, the processor 410 is a single-threaded processor. In another embodiment, the processor 410 is a multi-threaded processor. The processor 410 is capable of processing instructions stored in the memory 420 or on the storage device 430 to display graphical information for a user interface on the input/output device 440.

The memory 420 stores information within the system 400. In one embodiment, the memory 420 is a computer-readable medium. In one embodiment, the memory 420 is a volatile memory unit. In another embodiment, the memory 420 is a non-volatile memory unit.

The storage device 430 is capable of providing mass storage for the system 400. In one embodiment, the storage device 430 is a computer-readable medium. In various different embodiments, the storage device 430 may be a floppy disk device, a hard disk device, an optical disk device, or a tape device.

The input/output device 440 provides input/output operations for the system 400. In one embodiment, the input/output device 440 includes a keyboard and/or pointing device. In one embodiment, the input/output device 440 includes a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method relating to rule-regulated configuration of software, the method comprising:

receiving, by a recipient computer system, data characterizing an unsuccessful configuration that a sender computer system sends to the recipient computer system upon software being unsuccessfully configured in the sender computer system, the sender computer system being one of a plurality of computer systems configuring the software and being in communication with the recipient computer system, wherein validation rules that regulate screens presented to a user in a user interface for configuring the software allowed the unsuccessful configuration on the sender computer system, the validation rules causing a sequence of screens to be presented to the user, the sequence of screens including a first screen, a second screen displayed after the first screen, and a third screen displayed after the first screen and the second screen;

modifying, in the recipient computer system, the validation rules using the unsuccessful configuration to either add a rule prohibiting the unsuccessful configuration or remove a rule allowing the unsuccessful configuration; and providing, by the recipient computer system, the modified validation rules to the sender computer system, wherein the modified validation rules regulate screens presented to the user in the user interface when subsequently configuring the software on the sender computer system, the modified validation rules preventing display of the second screen in the sequence while enabling display of the first screen and the third screen in the sequence, the modified validation rules being stored in a repository coupled to the recipient computer system and being available to each of the plurality of computer systems configuring the software.

2. The method of claim 1, wherein the sender computer system retrieved the validation rules from the recipient computer system in preparation for configuring the software.

3. The method of claim 1, further comprising performing a simulation in the recipient computer system upon receiving the unsuccessful configuration, wherein modifying the validation rules is based on the simulation.

4. The method of claim 3, wherein the simulation comprises creating a variation of the unsuccessful configuration and determining whether the variation successfully configures the software.

5. The method of claim 4, wherein the unsuccessful configuration comprises several parameters for configuring the software, at least some of the parameters being provided with values in the unsuccessful configuration.

6. The method of claim 5, wherein the variation comprises a change in at least one of the values.

7. The method of claim 6, wherein the change is based on a probabilistic distribution generated for the parameter to which the at least one value is provided.

8. The method of claim 7, wherein the probabilistic distribution is based on previously recorded configurations that the recipient computer system has received from any of several sender computer systems.

9. The method of claim 7, wherein the probabilistic distribution for the parameter is heuristically assigned.

10. The method of claim 5, wherein the variation comprises a change in which the at least some of the parameters are modified.

11. The method of claim 10, wherein the variation comprises fewer value-provided parameters than the unsuccessful configuration.

12. The method of claim 1, further comprising receiving a successful configuration that any of several sender systems sends to the recipient computer system, and modifying the modified validation rules in the recipient computer system using the successful configuration.

13. The method of claim 12, further comprising performing a simulation in the recipient computer system upon receiving the successful configuration, wherein modifying the modified validation rules is based on the simulation.

14. The method of claim 13, wherein the simulation comprises creating a variation of the successful configuration and determining whether the variation successfully configures the software.

15. The method of claim 14, wherein the successful configuration comprises several parameters for configuring the software, at least some of the parameters being provided with values in the successful configuration.

16. The method of claim 15, wherein the variation comprises a change in at least one of the values.

17. The method of claim 16, wherein the change is based on a probabilistic distribution generated for the parameter to which the at least one value is provided.

18. The method of claim 17, wherein the probabilistic distribution is based on previously recorded configurations that the recipient computer system has received from any of the several sender computer systems.

19. The method of claim 15, wherein the variation comprises a change in which the at least some of the parameters are modified.

20. The method of claim 19, wherein the variation comprises more value-provided parameters than the successful configuration.

21. The method of claim 1, wherein several sender computer systems apply the validation rules in configuring the software, further comprising providing the modified validation rules to the several sender computer systems.

22. A computer program product embodied in a non-transitory storage medium, the computer program product including instructions that, when executed, cause a processor to perform operations comprising:
  receiving data characterizing an unsuccessful configuration that a sender computer system sends to a recipient computer system upon software being unsuccessfully configured in the sender computer system, wherein validation rules that regulate screens presented to a user in a user interface of a software configuration program for configuring the software allowed the unsuccessful configuration, the validation rules causing a sequence of screens to be presented to the user in a wizard interface, the sequence of screens including a first screen, a second screen displayed after the first screen, and a third screen displayed after the first screen and the second screen;
  modifying, in the recipient computer system, the validation rules using the unsuccessful configuration; and
  providing the modified validation rules to the sender computer system, wherein the modified validation rules regulate screens presented to the user in the user interface when subsequently configuring the software, the modified validation rules preventing display of the second screen in the sequence in the wizard interface while enabling display of the first screen and the third screen in the sequence in the wizard interface;
  wherein the software configuration program is generated using a design-time software program, the design-time software program comprising:
  a flow-generator module that:
  (i) generates a function group used by other software modules of the design-time software program to store data objects used in generating the software configuration program;
  (ii) displays a graphical user interface that prompts a programmer to define a command structure that is to be executed by the software configuration program;
  (iii) identifies a graphical user interface and a textual explanation with particular steps defined in the command structure;
  a view-generator module that generates and binds a graphical user interface to the command structure defined by the flow-generator;
  a rule-generator module that allows a user to define one or more rules that are to be executed by the software configuration program in response to a particular event; and
  a help-generator module that provides a graphical user interface that allows a user to describe, using free-form text, steps and user-selectable options available to a design-time user during execution of the software configuration program.

23. A method relating to rule-regulated configuration of software, the method comprising:
  receiving data characterizing an unsuccessful configuration that a sender computer system sends to a recipient computer system upon software being unsuccessfully configured in the sender computer system, wherein validation rules that regulate screens presented to a user in a user interface of a software configuration program for configuring the software allowed the unsuccessful configuration, the validation rules causing a sequence of screens to be presented to the user in a wizard interface, the sequence of screens including a first screen, a second screen displayed after the first screen, and a third screen displayed after the first screen and the second screen;

modifying, in the recipient computer system, the validation rules using the unsuccessful configuration; and providing the modified validation rules to the sender computer system, wherein the modified validation rules subsequently regulate the configuration of the software on the sender computer system;

wherein the software configuration program is managed and controlled by a run-time software program, the run-time software program comprising:

a flow controller that provides execution control for the software configuration program by control navigation of steps that were defined by a design-time software program;

a data-loading controller that provides data access functionality for the software configuration program;

a data-validation controller that executes one or more rules defined by the design-time software program; and a data persistence controller that provides storage of software application configuration data entered by a run-time user.

* * * * *